Aug. 16, 1966   L. C. GALLEHER   3,266,330
POWER TRANSMISSION
Filed June 15, 1964   4 Sheets-Sheet 3
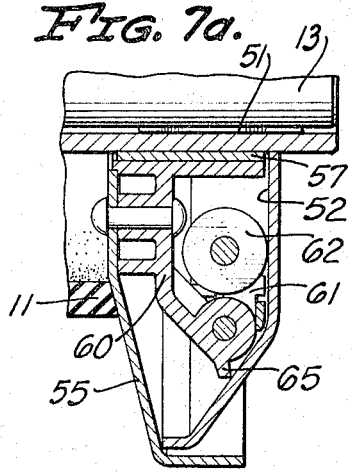
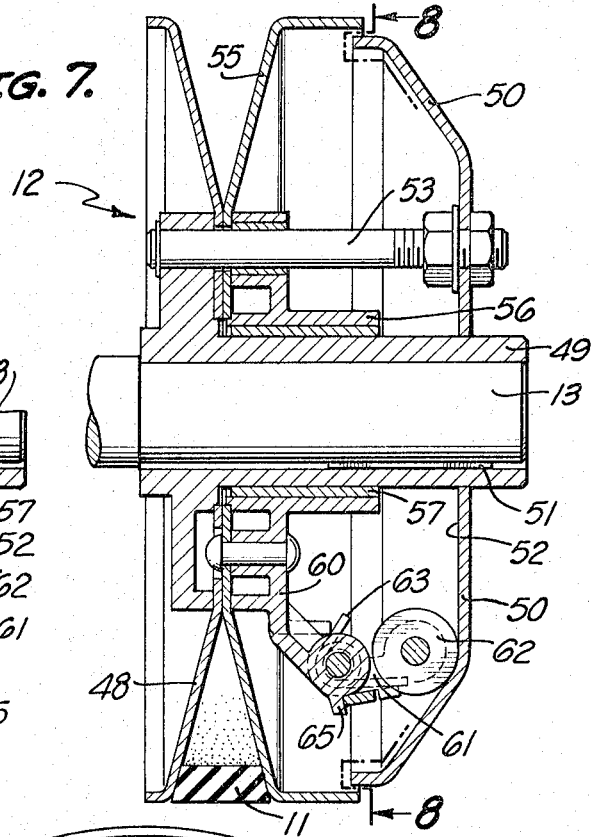
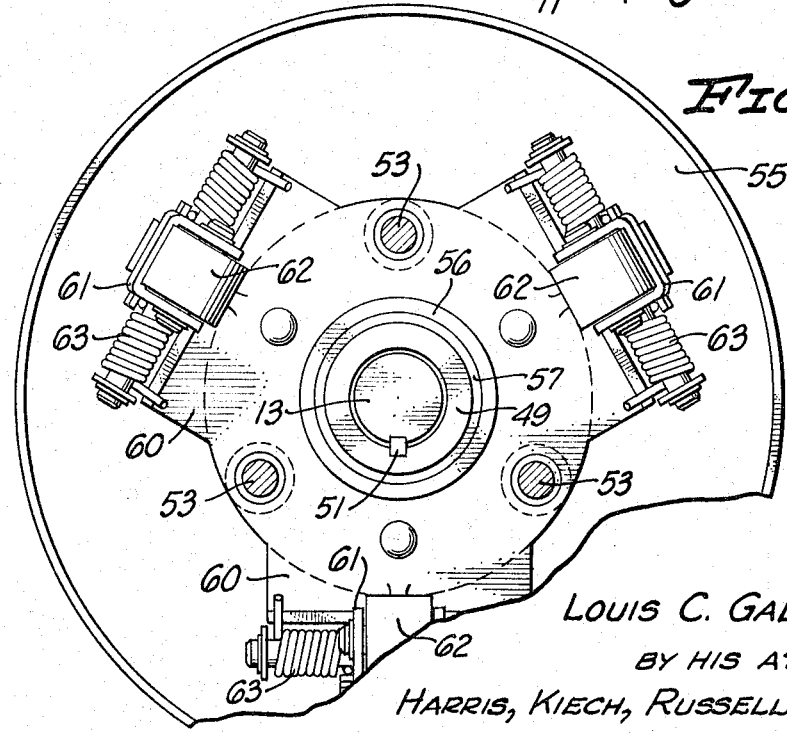
INVENTOR.
LOUIS C. GALLEHER
BY HIS ATTORNEYS
HARRIS, KIECH, RUSSELL & KERN

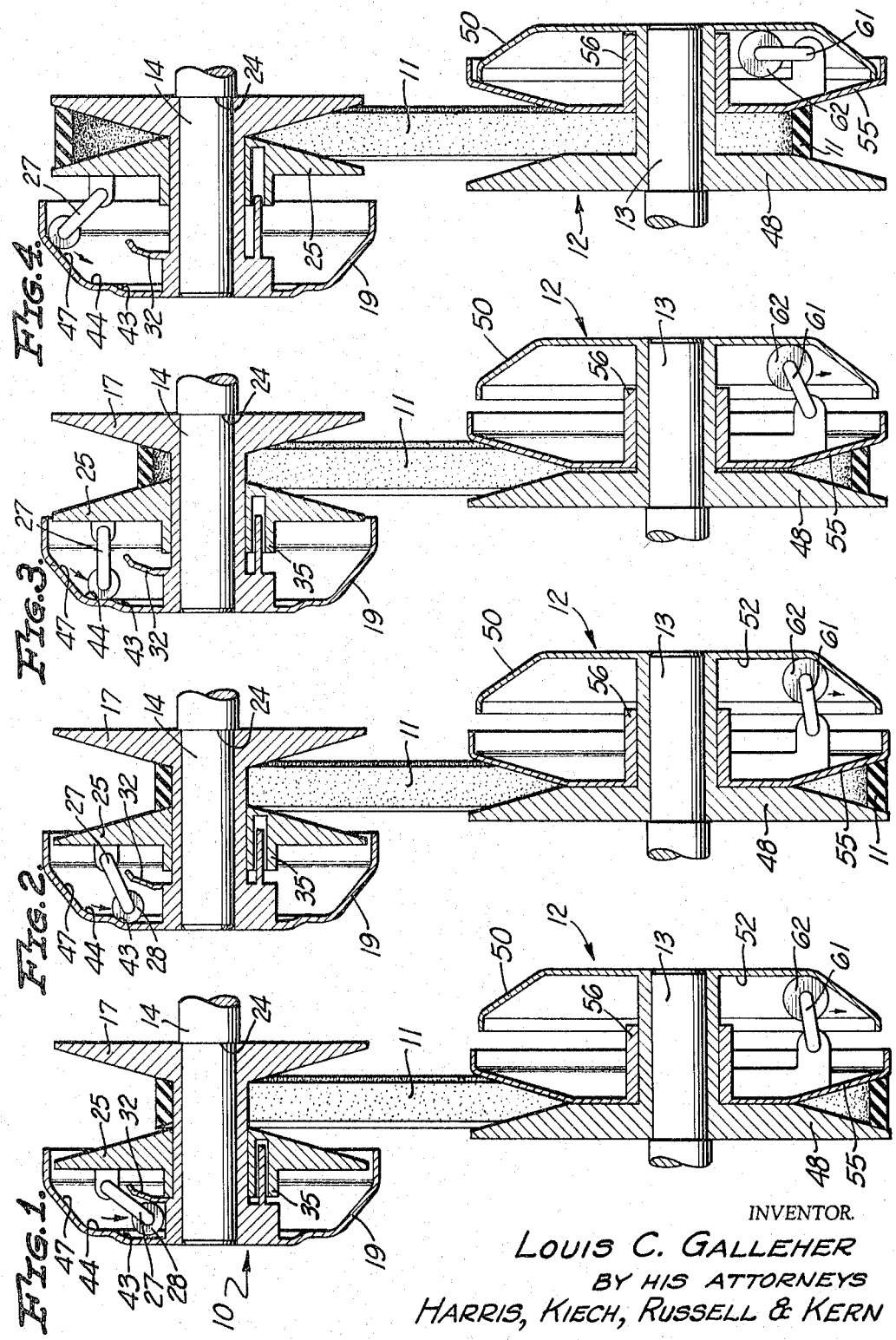

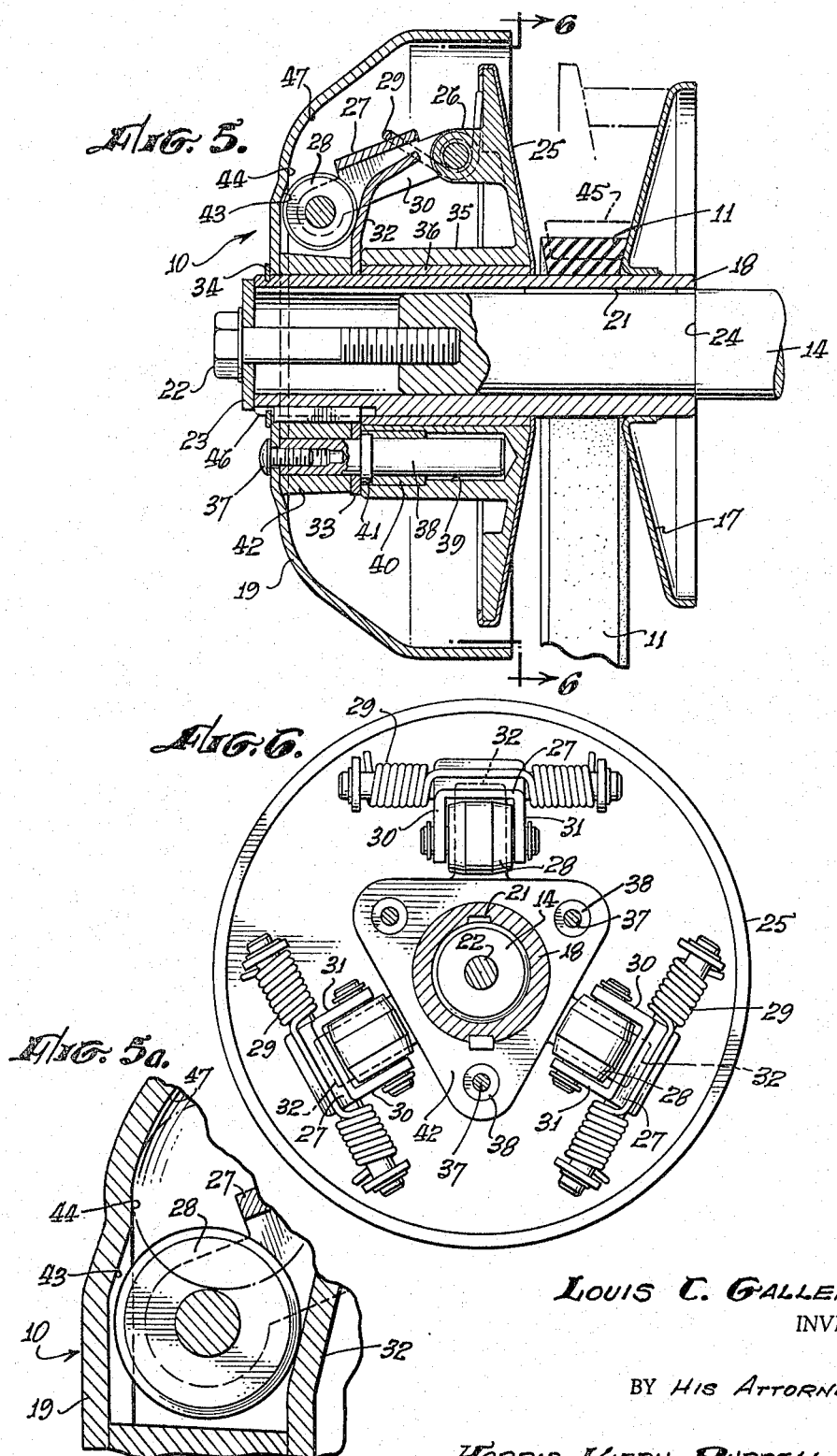

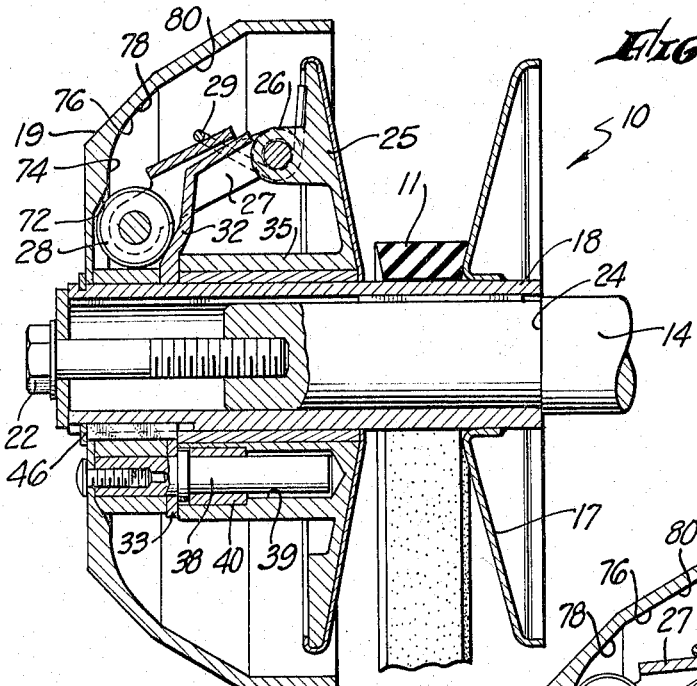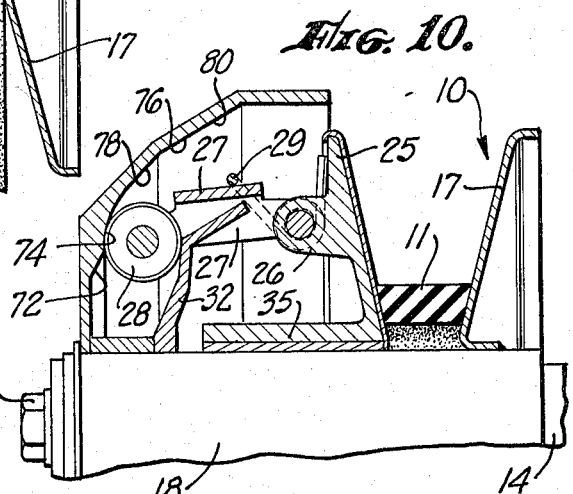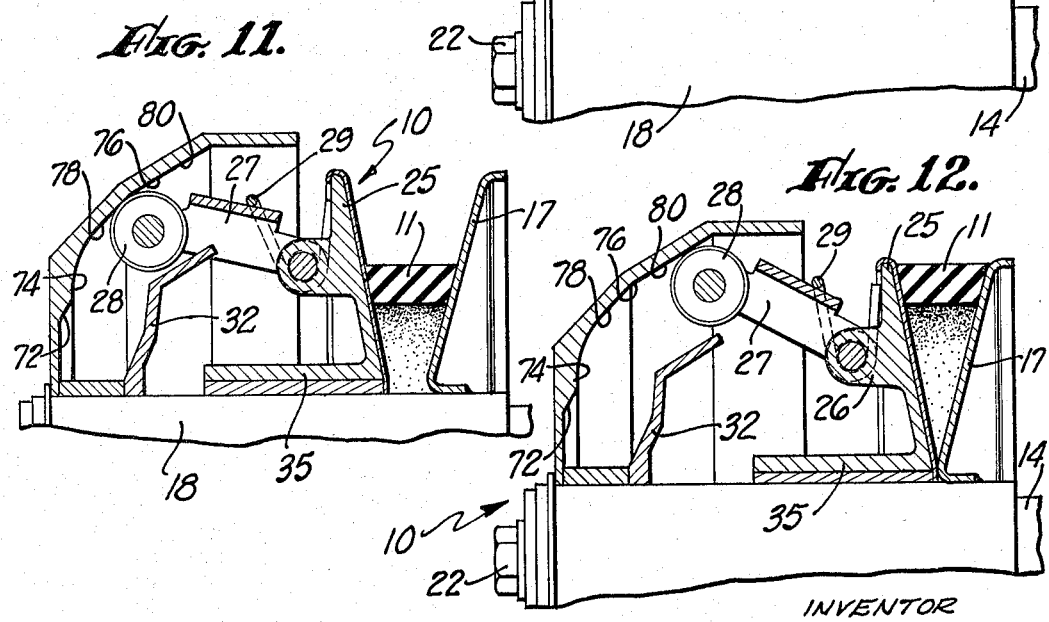

United States Patent Office 3,266,330
Patented August 16, 1966

3,266,330
POWER TRANSMISSION
Louis C. Galleher, Los Angeles, Calif., assignor, by mesne assignments, to Clarence E. Fleming, Jr., and Clifford R. Anderson, Jr., both of Pasadena, Calif.
Filed June 15, 1964, Ser. No. 377,170
27 Claims. (Cl. 74—230.17)

This invention relates to variable-speed V-belt transmissions by which power is transmitted from a driving shaft to a driven shaft. This application is a continuation-in-part of Serial Number 265,015, filed March 11, 1963, now abandoned, and of Serial Number 150,498, filed November 6, 1961, now abandoned, the former application having been filed as a continuation-in-part of the latter.

Each of the shafts commonly carries a pulley which has a pair of opposed conical pulley flanges which between them provide a V-shaped groove adapted to receive a pulley belt connecting the two pulleys. In a power transmission of the V-belt type, the ratio of effective diameters of the two pulleys carried by the driving and driven shafts is varied by movement of one of the pulley flanges of each of the pulleys. V-belt power transmissions are commonly used on small vehicles, such as golf-carts, scooters, snow vehicles, power wheelbarrows, small automobiles, and the like; however, their use is by no means restricted to such vehicles but may be utilized as desired on any equipment where automatic variable speed transmission means can be used to advantage over other means of changing speeds.

The sides of the belt of power transmissions of the V-belt type are gripped between the opposed pulley flanges of the respective pulleys. In power transmissions of this type now commonly in use there is, with increasing speed of the belt, a continually increasing pressure applied by the pulley flanges against the sides of the belt. It is known that in the transmission of power with a V-belt type transmission the lateral belt pressure required at low belt speeds to forestall belt slippage is considerably larger than that desirably employed at higher belt speeds. At high belt speeds undue wear of the belt and pulleys will occur if excessive pressures are applied by the flanges to the belt. Excessive lateral belt pressures at high belt speed will also lead to power loss and heating.

It is conventional practice in V-belt power transmissions to provide the driving pulley with means for holding its movable flange out of engagement with the belt at idling speeds. With this arrangement, the driving pulley flanges are held open permitting the pulley to freely rotate inside the slackened belt. As engine speed is accelerated to a belt engagement speed, the flanges of the driving pulley are caused to close to grip the belt and activate the transmission. The initial engagement of the driving pulley flanges and belt is commonly accompanied by an undesirable jerk or grab.

It is, therefore, a primary object of this invention to provide an improved V-belt type power transmission in which the pressure against the sides of the belt is progressively decreased with increase in belt speeds, thereby minimizing belt wear and reducing or forestalling belt slippage at low speeds.

A further object of the invention is to provide an improved mechanism for holding the movable flange of the driving pulley out of engagement with the belt at idling speeds.

Another object of the invention is to provide means for cushioning the initial engagement of the flanges of the driving pulley and belt, thus reducing the grabbing now commonly experiened.

A still further object of the invention is to provide a V-belt type power transmission wherein substantially full engine torque is transmitted in low speed or maximum speed reduction position. In the improved design of the invention lateral belt pressure required for full torque transmission is provided at a speed slightly higher than engagement speed and this pressure is maintained up to shifting speed.

Still another object of the invention is to provide driving and driven pulleys of improved design incorporating features not heretofore utilized.

A still further object is to provide a V-belt power transmission which embodies features providing for superior performance and of a design that may be readily manufactured and manufactured at a reduced cost.

Another object is to provide novel mechanical details for accomplishing the foregoing objects. Other objects and advantages will appear from the followng specification and drawings, in which:

FIG. 1 is a schematic view of a preferred embodiment of the V-belt power transmission of the invention, illustrating the mechanism in its idling or released position;

FIG. 2 is another schematic view illustrating the V-belt power transmission of FIG. 1 in its initial engagement position, wherein the flanges of the driving pulley first grip the V-belt;

FIG. 3 is a schematic view showing the V-belt power transmission of FIG. 1 in its low speed position;

FIG. 4 is a further schematic view illustrating the V-belt power transmission of FIG. 1 in its high speed position;

FIG. 5 is a longitudinal sectional view illustrating one form of the driving pulley of the invention in its belt disengagement position;

FIG. 5A is a fragmentary enlargement of a portion of the longitudinal sectional view of FIG. 5;

FIG. 6 is a cross-sectional view taken along line 6—6 of FIG. 5;

FIG. 7 is a longitudinal sectional view of a preferred form of the driven pulley of the invention;

FIG. 7A is a fragmentary enlargement of a portion of FIG. 7 with the driven pulley in its high speed position;

FIG. 8 is a fragmentary cross-sectional view taken along line 8—8 of FIG. 7;

FIG. 9 is a longitudinal sectional view illustrating still another form of the driving pulley of the invention in its belt disengagement position and with a cam following roller against a holding plate;

FIG. 10 is a fragmentary sectional view of the device of FIG. 9 with the cam following roller illustrated in its low speed position;

FIG. 11 is another fragmentary longitudinal sectional view of the device of FIG. 9 illustrating the cam following roller in its intermediate speed position; and FIG. 12 is another fragmentary longitudinal sectional view of the device of FIG. 9 illustrating the cam following roller in its high speed position.

The power transmission of the invention (see FIG. 1) is made up of a driving pulley 10 connected through a V-belt 11 of trapezoidal section to a driven pulley 12 carried by a power output shaft 13. The driving pulley 10 is mounted on a shaft 14 of an internal combustion engine, not shown.

Referring to FIGS. 5 and 6, the driving pulley 10 is seen to include a fixed flange 17 held to one end of an elongated tubular hub 18. The tubular hub at its other end has fixed to it a shell-like ramp plate 19. A key 21 connecting the tubular hub 18 to the shaft 14 forestalls independent circumferential movement of the hub with respect to the shaft 14. A cap screw 22, which is threaded into one end of the shaft 14, together with a washer 23 holds the tubular hub 18 to the shaft with the opposite end of hub 18 (removed from the cap screw) bearing against a shoulder 24 of the shaft.

A movable flange 25 is carried on the aforementioned tubular hub 18. As best seen in FIG. 5, the movable flange 25 has a short tubular portion 35 into which there is press fitted a cylindrical bushing 36 conveniently made of bronze. The bushing 36 is in sliding engagement with the elongated tubular hub 18 of the assembly. The movable flange 25 has three spaced brackets 26 integral with its outside face, each of which brackets has pivoted to it an arm 27 which is movable toward and away from the rotatable shaft 14. The outer end of each arm 27 carries a cam following roller 28. A torsion spring 29 forces each of the roller arms 27 toward the shaft 14. Opposite sides 30 and 31 of each roller arm 27 straddle a belt tension release or holding plate 32, and, in the idling position illustrated in FIG. 5, the roller 28 presses against the face of the belt tension release plate remote from the movable flange 25. The release plates 32 associated with the three roller arms 27 are spaced, outwardly-reaching arms of an integrally formed spider member 33 which is fixed to the tubular hub 18 between the movable flange 25 and the ramp plate 19. In the position illustrated the movable pulley flange 25 is held free of the belt 11, and thus the pulley is free to rotate without transmitting torque to the belt. The torsion spring 29 has sufficient tension to hold the roller 28 against the release plate 32 until a predetermined engagement speed is reached; that is, the speed at which it is desired that the movable flange 25 contact the belt 11.

The shell-like ramp plate 19 has fixed to it by bolts 37 three guide pins 38 which terminate in cavities 39 in the tubular portion 35 of movable flange 25. The cavities 39 carry bushings 40 which slidably contact the guide pins 38. The guide pins 38 centrally of their length are provided with annular shoulders 41 which bear against one face of the release plate spider member 33 holding the latter member in its fixed position against a tubular spacer member 42 of triangular cross section. The spacer member 42 at its other end abuts against the ramp plate 19. The spacer member 42 is held to the tubular hub 18 of the assembly by a key 46. The ramp plate 19 is held to the tubular hub 18 and against the spacer member 42 by a snap lock ring 34.

The ramp plate 19 has a cam surface on its inner face for slidably engaging the outer ends of the pivoted arms or, more exactly for engaging the rollers 28. Upon outward movement of the arms 27 away from the belt tension plates 32, the rollers 28 contact a first portion 43 of the cam surface. This first portion of the cam surface has a relatively acute angle which serves to bring the movable flange 25 into early contact with the belt 11, providing a cushioned engagement without movement of the driven pulley 12 or of the vehicle. The contact speed at which the movable flange 25 first contacts the belt is considerably less than engagement speed at which the belt 11 commences to drive the driven pulley 12. The exact degree of angle desirable for any particular driving pulley will depend on the relative size and configuration of the component parts of the assembly. Generally speaking, the first portion 43 of the cam surface will normally have an angle within the range of approximately 62.5° to 86.5° with reference to the rotatable shaft 14. The first portion 43 of the cam surface, in addition to bringing the movable flange 25 into early contact with the belt, also because of its acute angle, provides sufficient resistance to centrifugal force acting on the rollers 28 so as to retard axial movement of the movable flange 25 into full engagement with the belt 11 until the desired engagement speed is reached. In the designs commonly employed in the past, the movable flange has approached the belt at too high a speed and consequently with too much force. As a result there is a definite "grab" when the flange engages the belt. In the design of the invention, the contact speed being at a r.p.m. considerably below the engagement speed, there is substantially no "grabbing" when the flange 25 grips the belt at engagement speed. In prior art design, the belt contact speed and engagement speed has occurred at the same high r.p.m. It has been proposed heretofore, in an effort to obtain a cushioning effect, that engagement speed be reduced but this has not proven feasible as low engagement speeds interfere with proper idling.

A usual engagement speed for the power transmission is approximately 1600 r.p.m., but may be as low as 1000 r.p.m. for larger models or as high as 2200 r.p.m. for smaller models, with optional engagement speeds available on all models.

After the flange 25 of the driving pulley 10 contacts and grips the side of the belt 11, sufficient pressure is provided in the improved design of the invention to transmit substantially full engine torque in the low speed position and maintain this pressure through the low speed position up to shifting speed. In conventional V-belt power transmission designs commonly used, the pressure applied is in direct proportion to the speed square of the shaft 14 and, as a result, there is considerable differential in speed between belt and pulley engagement and the speed at which sufficient belt pressure is generated to transmit the full torque of the engine. In the instant design, the required lateral of axial belt pressure to transmit substantially full engine torque at a speed slightly higher than engagement speed and approximately the same pressure is maintained through the low speed position up to shifting speed. The amount of lateral pressure applied to the belt of the instant design is controlled by the driven pulley 12, and, as subsequently described, the lateral belt pressure, in the high speed position decreases with increase in belt speed.

The driving pulley of the invention is provided with a second portion 44 of the cam surface of the ramp plate 19 having a zero angle, i.e., the second cam portion 44 is substantially perpendicular to the rotatable shaft. The straight second portion 44 desirably terminates at a point on the ramp cam surface lying substantially on a line paralleling the shaft 14 which line passes through the pivot site of the roller arm 27. The device is in its low speed position when the rollers 28 engage the cam surface portion 44. With this arrangement, upon movement of the arms and rollers 28 into engagement with the second portion 44, the pulley serves briefly as a fixed flange pulley and will remain in this position through a small increase in r.p.m., until a still further increase in shaft speed causes the rollers to move further along the ramp against the tension of the torsion springs 29, thus bringing about a shift in pitch diameter of the belt. The pitch diameter of the belt in the low speed position is indicated in dotted lines 45 of FIG. 5. In one preferred embodiment of the driving pulley of the invention, the second portion 44 of the ramp cam surface is designed to require a further increase of 400 to 500 r.p.m. before the rollers 28 move away from their low speed positions, that is, beyond the second portion 44 and along a third, curved portion 47 of the ramp cam surface toward the high speed position of the V-belt power transmission.

The driving pulley 10 is illustrated in FIG. 1 in its idling position, in FIG. 2 in its initial belt engaging position, in FIG. 3 in its low speed position and in FIG. 4 in its high speed position. The relative positions of the driven pulley 12 for each of the foregoing conditions is also illustrated.

Another form of the driving pulley 10 is illustrated in FIGS. 9–12. The only difference between the modified form of these figures resides in the ramp plate 19 which is provided with a somewhat different camming surface on its inner concave face, as hereinafter described. Except for the ramp plate 19, the structure of the device of FIGS. 9–12 is substantially like that of the driving pulley illustrated in FIGS. 5, 5A and 6, and like numbers are used in the two versions of the driving pulley to designate like members. As in the earlier version, the driving pulley 10 includes a fixed flange 17 held to one end of an elongated tubular hub 18 which hub at its other end is fixed to the shell-like ramp plate 19. Since the structures of the two versions of the driving pulley are substantially alike, the detailed description of the common features will not be repeated here and reference may be made to the earlier description of FIGS. 5 and 6 for further information.

The ramp plate 19 of the driving pulley of FIG. 5 provides, in fact, infinitely variable ratios between the low speed position occurring when the rollers 28 engage the cam surface portion 44 (FIG. 3) and the full high speed position as illustrated in FIG. 4. In some applications where the overloads are abnormal there will be a tendency to shift all the way to the low position of FIG. 3 from the high position of FIG. 4 resulting in a rather sudden drop in the speed of the driven vehicle. To remedy this tendency in driving pulleys intended for use where substantial overloads may occur, the driving pulley illustrated in FIGS. 9–12 is provided. It will be seen that the cam surface of the ramp plate 19, which is found on the innerface of that member, differs in some respects from that illustrated in FIGS. 5 and 5A. The ramp plate 19 of the device of FIG. 9 is provided with a first portion 72 which desirably has a relatively acute angle which serves to bring the movable flange 25, as described earlier, into early contact with the belt 11, thereby providing a cushioned engagement without movement of the driven pulley 12 or of the vehicle. The first portion 72 of the cam surface of the ramp plate of the device of FIG. 9, in addition to bringing the movable flange 25 into early contact with the belt, also provides sufficient resistance to centrifugal force acting on the rollers 28 so as to retard axial movement of the movable flange 25 into full engagement with the belt 11 until the desired engagement speed is reached.

After the flange 25 of the driving pulley 10 contacts and grips the side of the belt 11, sufficient pressure is asserted to transmit substantially full engine torque in the low speed position and maintain this pressure through the low speed position up to shifting speed. The device is in its low speed position when the rollers 28 engage a second portion 74 (FIG. 10) of the cam surface of the ramp plate 19. This second cam surface portion 74 is provided with a zero or nearly zero angle; that is, the second cam portion 74 is substantially perpendicular to the rotatable shaft. The second portion 74 terminates approximately at a point on the ramp cam surface lying substantially on a line paralleling the shaft 14 which line passes through the pivot site of the roller arm 27. As described previously, upon movement of the rollers 28 into engagement with the second portion 74, the pulleys act as a fixed flange pulley and will remain in this position through a small increase in r.p.m. until a further increase in shaft speed causes the rollers 28 to move upwardly along the ramp against the tension of the torsion springs 29 into a third portion 76 of the ramp cam surface.

The third portion 76 of the ramp cam surface of the driving pulley of FIGS. 9–12 differs from that earlier described and illustrated in FIG. 5 in being divided into a first section 78 and a second section 80 with an abrupt change in direction of the cam surface occurring at the juncture of the two sections. In the preferred embodiment illustrated in FIGS. 9–12, the cam surface upon the inside face of the ramp plate 19 defined by the second section 80 of the third portion 76 forms a 30° angle with a line paralleling the shaft 14 and passing through the juncture of the sections 78 and 80. The first section 78 of the third portion 76 of the cam surface on the interior face of the ramp plate 19 forms an acute angle of 135° with the same line passing through the juncture of the two sections. Thus, it is seen in the preferred embodiment illustrated there is a change in ramp angle at the juncture of the two sections of 15°. The change in ramp angle is desirably within the range of 10 to 20°. The exact location of the juncture of the two sections 78 and 80 of the third cam portion 76 may vary somewhat depending upon the particular design and the use to be made of the device, but generally it will be located more or less centrally of the length of the third cam portion 76.

Referring to the series of FIGS. 9–12, there will be seen four positions of each roller 28, the first position being that illustrated in FIG. 9 wherein the roller is held under the tension of the spring 29 against the tension or holding plate 32. This is the idling position of the device and it will be noted that the movable flange 25 is out of engagement with the belt 11. With an increase in r.p.m. of the shaft 14 the roller 28 moves into engagement with the first portion 72 of the cam surface of the ramp plate 19. In the particular sequence illustrated in FIGS. 9–12 this is not shown but reference to the schematic view of FIG. 2 will show the general location of the roller 28 at this time. The engagement of all of the rollers 28 with the first portion 72 of the cam surface brings the movable flange 25 into contact with the belt 11. After the flange 25 of the driving pulley 10 grips the side of the belt 11, sufficient pressure is provided to transmit substantially full engine torque in the low speed position provided by the second portion 74 (FIG. 10) of the cam surface. Depending upon the particular design, the rollers 28 will remain in contact with the second portion 74 of the cam surface for a further increase of perhaps 300 to 600 r.p.m. before the rollers move away from the low speed positions along the third portion 76 at the cam surface.

In the full high speed position of the device, the rollers 28 assume the positions illustrated in FIG. 12 wherein the rollers are located at the outer end of the second section 80 of the third portion 76 of the cam surface. With the provision of the break in the continuity of the cam surface of the third portion 76 provided at the juncture of the two sections 78 and 80, in the event there should be an excessive overload, the rollers 28 will move to assume the positions illustrated in FIG. 11 wherein they are located at the juncture of the two sections 78 and 80. Without this arrangement, in some applications there would be a tendency for the shift to continue to the low speed position (FIG. 10) provided by the second portion 74 of the cam surface. In the particular embodiment illustrated in FIGS. 9–12, there is a ratio of 1:1 between the driving and driven pulley with the rollers 28 in the high speed positions illustrated in FIG. 12. In the low speed position of FIG. 10, the ratio is 3:1, and in the intermediate speed position of FIG. 1 the ratio is 2:1. Generally speaking, the 3:1 ratio position is required only for starting the vehicle of the device and once in motion a shift from the 1:1 ratio position of FIG. 12 to the 2:1 ratio position of FIG. 11 is adequate to handle normal overloads encountered under the usual operating conditions. The provision of the 2:1 ratio position of FIG. 11 compared to the low speed 3:1 ratio position of FIG. 10 permits operation of the belt at a relatively large pitch diameter which extends the belt life appreciably and there is a minimum of loss in vehicle speed. In addition, the capacity of the drive with the 2:1 ratio is sufficient to assure no belt slip with resulting loss in power to tractive effort. The 15° differential in ramp angle provided at the juncture of the first and second sections 78 and 80 of the third portion 76 of the cam surface is generally sufficient to prevent the drive from shifting below the 2:1 ratio until the engine speed had reduced appreciably and, as has been stated, will usually provide sufficient advantage in tractive effort to handle the unusual overload without shifting further toward a 3:1 ratio position.

The driven pulley 12 of the invention is illustrated in FIGS. 7 and 8 where it is shown to comprise a fixed flange 48 held to an elongated tubular hub 49 which is held to the shaft 13 by a key 51. At the opposite end of the hub 49 from the fixed flange 48 there is provided a shell-like ramp plate 50 which has an elongated flat cam surface 52 that is substantially perpendicular to the shaft 13. The fixed flange 48 and ramp plate 50 are tied together by three horizontal bolts 53 which also serve as guide pins for the movable flange 55. The bolts 53 are adjustable to vary the distance between the fixed flange 48 and the ramp plate 50.

The movable flange 55 has a short tubular portion 56 which encloses a press fitted bushing 57, the latter bushing slidably engaging the outside surface of the tubular hub 49.

The movable flange 55 on its face remote from the belt 11 carries a multiplicity of equally spaced brackets 60, each of which brackets pivotally supports an arm 61 that extends toward the ramp plate 50. The flange 55 is illustrated to have three brackets 60. In a large unit more brackets will be employed. The free ends of the arms 61 carry rollers 62. Each of the brackets 60 supports a tension torsion spring 63 which urges the respective arm 61 and roller 62 outwardly away from the shaft 13 into engagement with a stop 65. The stops 65 hold the arms 61 approximately ten degrees or so away from the horizontal and inclined toward the shaft 13. The ramp plate 50 and arms 61 may be interchanged placing the ramp plate on the movable flange 55. Similarly the positions of the ramp plate 19 and arms 27 of the driving pulley 10 may be interchanged. With the position illustrated in FIG. 7 the pulley flanges 48 and 55 are in their released position, tightly closed and with the belt 11 adjacent the outer rim of the pulley.

As the driving pulley 10 moves into its low speed position of FIG. 3, tension is applied to the driven pulley flanges through the belt 11, causing the movable flange 55 of the driven pulley to move outwardly away from the fixed flange 48. The centrifugal force acting on the rollers 62 together with the tension applied by the torsion springs 63 acting against the ramp plate 50 at the relatively flat angle of the arms 61 (see FIG. 3) produces a relatively high axial pressure against the sides of the belt 11 which is required, as explained before, at low belt speeds for most efficient operation.

As the centrifugal force acting on the rollers 28 of the driving pulley 10 develops sufficiently to close the pulley flanges of that pulley, the movable flange 55 of the driven pulley 12 is forced away from the fixed flange 48 and the belt 11 progressively assumes a lesser pitch diameter with respect to the driven pulley. Eventually the rollers 62 and their arms 61 move into the positions illustrated in FIG. 4. In the position of FIG. 4, a line through the center of each of the rollers 62 and the center of the pivot of each arm 61 is substantially at a right angle to the center line of the hub 49 and shaft 13. In the latter position the axial or lateral pressure asserted against the belt 11 is at its minimum. If the line through the center of the roller 62 and the center of the pivot of the arm 61 is strictly at a right angle to the center line of the hub 49, there will be no axial pressure attributable to centrifugal force acting on the roller and arm. This feature of the device of the invention reduces significantly the wear of the belt and pulleys at higher belt speeds. Desired pressures at minimum flange opening and at maximum flange opening immediately preceding that of FIG. 4 may be selected by varying the length of the roller arms 61, the strength of the torsion springs 63, and the pressure angle of the arms 61 with respect to the movable flange 55.

In the preferred embodiment of the driven pulley illustrated in FIGS. 7 and 8, the ramp plate 50 is provided with the elongated flat cam surface 52 which is substantially perpendicular to the shaft 13. The arms 61 in cooperation with the flat cam surface 52 provide an axial component of pressure toward the movable flange 55 and belt 11 which decreases initially with the outward movement of the movable flange 55 away from the fixed flange 48. At more elevated speeds, centrifugal force acting upon the arms 61 and rollers 62 becomes significant and adds accordingly to the lateral belt pressure. In order to overcome this increase in lateral belt pressure at the high belt speeds, each arm 61 and its roller 62 in their innermost positions of FIGS. 4 and 7A lie on a line through the center of the roller and its point of pivot, which line is substantially at a right angle to the shaft 13. This arrangement minimizes or substantially eliminates the effect of centrifugal force on the lateral belt pressure. The cam surface 52 of the ramp plate 50 desirably has a flat surface as illustrated, but may be curved without interfering with the advantage to be had in the high speed position of FIG. 4 wherein the effect of centrifugal force on the lateral belt pressure is cancelled out.

The operation of the variable speed power transmission of the invention is illustrated in the sequence of FIGS. 1–4, inclusive. In FIG. 1 the device is in its release position and in this position the driving pulley flanges 10 are held open permitting the pulley to rotate freely inside the slackened belt 11. It will be seen that in the release position the distance between the flanges of the driving pulley 10 adjacent the shaft is greater than the width of the belt 11 and hence it is no possible for the flanges to grip the sides of the belt. The release position permits the engine to idle without connected load up to a predetermined engagement speed. In the release position, the flanges of the driven pulley 12 are closed and the belt 11 is held adjacent the outer periphery of that pulley. In the release position the rollers 28 of the driving pulley 10 are held in contact with the belt tension plates 32 holding the movable flange 25 out of contact with the belt.

When the speed of the shaft 14 reaches the predetermined speed, the rollers 28 of the driving pulley move out of contact with the belt tension plates 32 and into contact with the first portions 43 of the ramp cam surfaces. As explained earlier, the angle of the ramp plate at this contact point is such that the movable flange 25 is caused to slide along the tubular hub 18 into early contact with the belt 11. The relatively acute angle of the first portion 43 of the ramp cam surface cushions the application of pressure to the sides of the belt 11, minimizing grab at time of initial engagement. As illustrated in FIG. 2, there is no relative movement of the flanges of the driven pulley 12 from their earlier positions during initial engagement of the belt.

After the initial contact of the movable flange 25 of the driving pulley 10 with the belt 11 and at a slightly higher shaft speed each of the rollers 28 moves into the low speed position illustrated in FIG. 3. In this latter position the rollers 28 engage the second portions 44 of the ramp cam surfaces of the driving pulley 10. The flanges of the driving pulley 10 in the low speed position are momentarily fixed with respect to each other and a further increase in shaft speed within the speed range of the low speed position does not cause movement of the movable flange 25. The driving pulley 10 in the low speed position may be viewed as a fixed flange pulley.

When the driving pulley 10 assumes the low speed position of FIG. 3, the slack of the belt 11 is taken up and a force applied through the belt to the flanges of the driven pulley 12, causing movement of the movable flange 55 away from the fixed flange to the position illustrated. Centrifugal force acting on the rollers 62 of the driven pulley 12 and the force of the torsion springs 63 acting against the ramp plates 50 provide a high axial component of pressure to belt, which high pressure is required at low belt speed to assure transmission of substantially full engine power. When the speed of the engine shaft 14 exceeds the shifting speed of the transmission, the rollers 28 of the driving pulley 10 move beyond the low speed positions of the portions 44 of the ramp cam surfaces to the high speed positions provided along the curved third cam portions 47 of the ramp plates. With movement of the rollers 28 to the high speed positions, the flanges of the driving pulley 10 are caused to close, thus urging the belt 11 to a greater pitch diameter, and, simultaneously, the flanges of the driven pulley 12 are urged apart by the belt 11 with the result that the pitch diameter of the driven pulley is decreased, thus reducing the speed reduction ratio between the driving pulley 10 and the driven pulley 12. In the high speed position the rollers 62 of the driven pulley 12 move toward and eventually into the position illustrated in FIG. 4. With the rollers 62 in the positions illustrated in FIG. 4, the axial component of pressure applied to the movable flange and hence applied to the sides of the belt is significantly less than the pressure applied in the low speed position of FIG. 3. This, as explained earlier, is desirable because it minimizes wear of the belt and pulleys which tends to be excessive at high belt speeds. It will thus be seen, that the driven pulley 12 controls the lateral pressure applied to the belt.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:

1. In a variable speed pulley having a rotatable shaft and a pair of opposed conical pulley flanges positioned thereon and providing therebetween a V-shaped groove for a pulley belt, with one of the pulley flanges being movable axially of the rotatable shaft, the improvement comprising:
    an arm pivotally held to the pulley and movable toward and away from the rotatable shaft;
    means urging said arm inwardly toward the rotatable shaft; and
    a ramp plate having a cam surface for slidably engaging the outer end of the pivoted arm with a first portion of the cam surface adjacent the rotatable shaft being at an acute angle to the rotatable shaft, said cam surface of the ramp plate having a short second portion extending outwardly from the first portion, which second portion is substantially perpendicular to the rotatable shaft.

2. In a variable speed pulley having a rotatable shaft and a pair of opposed conical pulley flanges positioned thereon and providing therebetween a V-shaped groove for a pulley belt, with one of the pulley flanges being movable axially of the rotatable shaft, the improvement comprising:
    an arm pivotally held to the pulley and movable toward and away from the rotatable shaft;
    means urging said arm inwardly toward the rotatable shaft; and
    a ramp plate having a cam surface for slidably engaging the outer end of the pivoted arm with a first portion of the cam surface adjacent the rotatable shaft being at an acute angle to the rotatable shaft, said cam surface of the ramp plate having a short second portion extending outwardly from the first portion, which second portion is substantially perpendicular to the rotatable shaft, said cam surface having a third curved portion disposed outwardly of the second portion, said third portion of the ramp plate curving toward the movable flange.

3. In a variable speed pulley having a rotatable shaft and a pair of opposed conical pulley flanges positioned thereon and providing therebetween a V-shaped groove for a pulley belt, with one of the pulley flanges being movable axially of the rotatable shaft, the improvement comprising:
    an arm pivotally held to the movable flange and movable toward and away from the rotatable shaft;
    means for holding the movable flange away from the belt at lower speeds of the rotatable shaft;
    a spring means urging said arm inwardly toward the rotatable shaft and into engagement with said holding means when the shaft turns at a speed below a predetermined r.p.m.; and
    a ramp plate spaced from said movable flange and fixed to the shaft, said ramp plate having a cam surface for slidably engaging the outer end of the pivoted arm upon movement of the arm away from engagement with said holding means with a portion of the cam surface being shaped to bring the movable flange into early contact with the belt and thereafter retard further axial movement of the movable flange into full engagement with the belt.

4. In a variable speed pulley having a rotatable shaft and a pair of opposed conical pulley flanges positioned thereon and providing therebetween a V-shaped groove for a pulley belt, with one of the pulley flanges being movable axially of the rotatable shaft, the improvement comprising:
    an arm pivotally held to the movable flange and movable toward and away from the rotatable shaft;
    means for holding the movable flange away from the belt at lower speeds of the rotatable shaft;
    a spring means urging said arm inwardly toward the rotatable shaft and into engagement with said holding means when the shaft is turned at a speed below a predetermined r.p.m.; and
    a ramp plate spaced from said movable flange and fixed to the shaft, said ramp plate having a cam surface for slidably engaging the outer end of the pivoted arm upon movement of the arm away from engagement with said holding means, with a first portion of the cam surface adjacent the rotatable shaft being at an acute angle to the rotatable shaft, said cam surface of the ramp plate having a second portion extending outwardly from the first portion, which second portion is substantially perpendicular to the rotatable shaft, said ramp plate having a third curved portion disposed outwardly of the second portion, said third portion of the ramp plate curving toward the movable flange.

5. In a variable speed pulley having a rotatable shaft and a pair of opposed conical pulley flanges positioned thereon and providing therebetween a V-shaped groove for a pulley belt, with one of the pulley flanges being movable axially of the rotatable shaft, the improvement comprising:
    an arm pivotally held to the movable flange and movable toward and away from the rotatable shaft, said arm having a roller means at its outer end;
    a spring means urging said arm inwardly toward the rotatable shaft; and
    means providing for displacement of the movable flange away from the pulley belt when the rotatable shaft turns at an idling speed below a predetermined r.p.m., said displacement means including a release plate fixed to the shaft and spaced from the movable flange, said roller means of the pivoted arm in the idling position of the pulley engaging the remote face of the release plate with respect to the movable flange to hold the movable flange out of contact with the belt and said roller with increased rotation of the shaft above idling speed moving upwardly, against the force of the spring means and out of engagement with the release plate, thereby freeing the movable flange to move toward the other flange.

6. In a variable speed pulley having a rotatable shaft and a pair of opposed conical pulley flanges positioned thereon and providing therebetween a V-shaped groove for a pulley belt, with one of the pulley flanges being movable axially of the rotatable shaft, the improvement comprising:
- an arm pivotally held to the pulley and movable toward and away from the rotatable shaft;
- means urging said arm inwardly toward the rotatable shaft; and
- a ramp plate having a cam surface for slidably engaging the outer end of the pivoted arm, said cam surface being designed to bring the movable flange into early contact with the belt, said cam surface being provided with a relatively short flat portion disposed at an acute angle within the range of 62.5° to 86.5° to the rotatable shaft, said relatively short portion of the cam surface following initial contact of the movable flange and belt serving to retard further axial movement of the movable flange into full engagement with the belt.

7. In a variable speed pulley having a rotatable shaft and a pair of opposed conical pulley flanges positioned thereon and providing therebetween a V-shaped groove for a pulley belt, with one of the pulley flanges being movable axially of the rotatable shaft, the improvement comprising:
- an arm pivotally held to the pulley and movable toward and away from the rotatable shaft;
- means urging said arm inwardly toward the rotatable shaft; and
- a ramp plate having a generally concave cam surface for slidable engagement by the outer end of the pivoted arm, said cam surface of the ramp plate having a relatively short portion which is substantially perpendicular to the rotatable shaft and a succeeding relatively long portion disposed outwardly of the relatively short portion of the cam surface, said relatively long portion of the cam surface of the ramp plate curving generally toward the movable flange.

8. In a variable speed pulley having a rotatable shaft and a pair of opposed conical pulley flanges positioned thereon and providing therebetween a V-shaped groove for a pulley belt, with one of the pulley flanges being movable axially of the rotatable shaft, the improvement comprising:
- an arm pivotally held to the movable flange and movable toward and away from the rotatable shaft;
- means urging such arm inwardly toward the rotatable shaft; and
- a ramp plate fixed to the rotatable shaft and having a generally concave cam surface for slidable engagement by the outer end of the pivoted arm, said cam surface of the ramp plate having a relatively short portion which is substantially perpendicular to the rotatable shaft and a succeeding relatively long portion disposed outwardly of the relatively short portion of the cam surface, said relatively long portion of the cam surface of the ramp plate curving generally toward the movable flange.

9. In a variable speed pulley having a rotatable shaft and a pair of opposed conical pulley flanges positioned thereon and providing therebetween a V-shaped groove for a pulley belt, with one of the pulley flanges being movable axially of the rotatable shaft, the improvement comprising:
- an arm pivotally held to the pulley and movable toward and away from the rotatable shaft;
- means urging said arm inwardly toward the rotatable shaft; and
- a ramp plate having a cam surface for slidable engagement by the outer end of the pivoted arm with a first portion of the cam surface adjacent the rotatable shaft being at an acute angle to the rotatable shaft, said cam surface of the ramp plate having a short second portion extending outwardly from the first portion, which second portion is substantially perpendicular to the rotatable shaft, and said cam surface having a third portion disposed outwardly of the second portion and curving generally toward the movable flange and including a first section followed by a second section with an abrupt change in direction of the cam surface at the juncture of the two sections of said third portion.

10. A variable speed pulley in accordance with claim 9 wherein the change in ramp angle between the first and second sections at the juncture of said two sections is between 10° and 20°.

11. A variable speed pulley in accordance with claim 10 wherein the change in ramp angle is about 15°.

12. In a variable speed pulley having a rotatable shaft and a pair of opposed conical pulley flanges positioned thereon and providing therebetween a V-shaped groove for a pulley belt, with one of the pulley flanges being movable axially of the rotatable shaft, the improvement comprising:
- an arm pivotally held to the movable flange and movable toward and away from the rotatable shaft;
- means for holding the movable flange away from the belt at lower speeds of the rotatable shaft;
- a spring means urging said arm inwardly toward the rotatable shaft and into engagement with said holding means when the shaft is turned at a speed below a predetermined r.p.m.; and
- a ramp plate spaced from said movable flange and fixed to the shaft, said ramp plate having a cam surface for slidable engagement by the outer end of the pivoted arm upon movement of the arm away from engagement with said holding means, with a first portion of the cam surface adjacent the rotatable shaft being at an acute angle to the rotatable shaft, said cam surface having a second portion extending outwardly from the first portion, which second portion is substantially perpendicular to the rotatable shaft, said ramp plate having a third portion disposed outwardly of the second portion and curving generally toward the movable flange and including a first section followed by a second section with an abrupt change in direction of the cam surface at the juncture of the two sections of said third portion.

13. In a variable speed pulley having a rotatable shaft and a pair of opposed conical pulley flanges positioned thereon and providing therebetween a V-shaped groove for a pulley belt, with one of the pulley flanges being movable axially of the rotatable shaft, the improvement comprising:
- an arm pivotally held to the pulley and movable toward and away from the rotatable shaft;
- means urging said arm inwardly toward the rotatable shaft; and
- a ramp plate having a cam surface for slidable engagement by the outer end of the pivoted arm, said cam surface being designed to bring the movable flange into early contact with the belt, said cam surface being provided with a first relatively short flat portion disposed at an acuate angle within the range of 62.5° to 86.5° to the rotatable shaft, said first portion of the cam surface following initial contact of the movable flange and belt serving to retard further axial movement of the movable flange into full engagement with the belt, said cam surface of the ramp plate having a short second portion extending outwardly from the first portion, which second portion is substantially perpendicular to the rotatable shaft, and said cam surface having a third portion disposed outwardly of the second portion and curving generally toward the movable flange and including a first section followed by a second section with an abrupt change in direction in the cam surface at the juncture of said first and second sections and within the first section immediately preceding the juncture having an inside ramp angle of about 135° to a line through said juncture and paralleling the rotatable shaft and with the second section immediately adjoining said juncture having an inside angle of about 30° with said line paralleling the rotatable shaft.

14. In a variable speed pulley having a rotatable shaft and a pair of opposed pulley flanges positioned thereon and providing therebetween a V-shaped groove for a pulley belt with one of said pulley flanges being movable axially of said rotatable shaft, the improvement comprising:
 a swingingly mounted arm pivotally held to the pulley and movable toward and away from the rotatable shaft;
 a cam means coacting with said arm to oppose outward movement of the movable flange;
 means urging the arm away from the rotatable shaft;
 said arm with outward movement of the movable flange being forced by the cam means inwardly toward the rotatable shaft; and
 said arm having a length so related to its point of pivot as to permit movement of the arm into substantially perpendicular disposition to the rotatable shaft upon inward movement of said arm.

15. A pulley in accordance with claim 14 wherein the free end of the arm carries a weighted roller.

16. A pulley in accordance with claim 14 wherein with the flanges of the pulley closely spaced said arm is held by said urging means against a stop that forestalls further outward swinging of said arm, said arm when in contact with said stop assuming a nearly parallel position with respect to the rotatable shaft with the free end of said arm pointing toward said rotatable shaft.

17. In a variable speed pulley having a rotatable shaft and a pair of opposed pulley flanges positioned thereon and providing therebetween a V-shaped groove for a pulley belt with one of said pulley flanges being movable axially of said rotatable shaft, the improvement comprising:
 an arm pivotally held to the movable flange and movable toward and away from the rotatable shaft;
 a weighted roller pivotally attached to the free end of said arm;
 means urging said arm outwardly from the rotatable shaft;
 a cam means coacting with the weighted roller to oppose outward movement of the movable flange;
 said arm, with outward movement of the movable flange, being forced by the cam means inwardly toward the rotatable shaft; and
 said arm having a length so related to its point of pivot as to permit movement of the weighted roller into a position wherein a line through the center of said roller and said point of pivot is substantially at a right angle to the rotatable shaft, said latter position being assumed by the roller upon swinging of said arm to its innermost position.

18. A variable speed pulley in accordance with claim 17 wherein the means urging the arm outwardly is a spring.

19. A variable speed pulley having a rotatable shaft and a pair of opposed pulley flanges positioned thereon and providing therebetwen a V-shaped groove for a pulley belt with one of said pulley flanges being movable axially of said rotatable shaft, the improvement comprising:
 an arm pivotally held to the movable flange and movable toward and away from the rotatable shaft;
 means urging said arm outwardly with respect to the rotatable shaft;
 a ramp plate spaced from said movable flange and fixed to the shaft with the free end of the arm being in slidable engagement therewith, said arm with the movable flange close to the other flange assuming an outwardly swung position, and with movement of the movable flange away from the other flange, said arm moving inwardly along the ramp plate in opposition to the means urging the arm outwardly and toward the rotatable shaft; and
 said arm having a length so related to its point of pivot as to permit movement of the arm into substantially perpendicular disposition to the rotatable shaft upon swinging said arm to its innermost position.

20. A variable speed pulley in accordance with claim 19 wherein the means urging the arm outwardly is a torsion spring.

21. A variable speed pulley in accordance with claim 19 wherein the ramp plate has a substantially flat cam surface which is in contact with the outer end of the arm throughout at least most of the inward swinging of said arm.

22. A pulley in accordance with claim 19 wherein with the flanges of the pulley closely spaced said arm is held by said urging means against a stop that forestalls further outward swinging of said arm, said arm when in contact with said stop assuming a nearly parallel position with respect to the rotatable shaft with the free end of said arm pointing toward said rotatable shaft.

23. A variable speed power transmission comprising:
 a driving pulley having a pair of opposed conical pulley flanges positioned on a first rotatable shaft and providing therebetween a V-shaped groove for a pulley belt with one of the pulley flanges being movable axially of the first rotatable shaft;
 a driven pulley having a pair of opposed conical pulley flanges positioned on a second rotatable shaft and providing therebetween a V-shaped groove for a pulley belt, with one of the pulley flanges thereof being movable axially of the second rotatable shaft;
 a belt connecting said driving pulley and driven pulley;
 a mechanism for urging said movable flange of the driving pulley toward the other flange of said driving pulley, said mechanism including a first arm pivotally held to the movable flange of the driving pulley movable toward and away from the first rotatable shaft, means urging said first arm toward the first rotatable shaft, a first ramp plate spaced from said movable flange of the driving pulley and fixed to the first shaft, said first ramp plate having a cam surface for slidably engaging the outer end of the first pivoted arm with a portion of the cam surface adjacent the first rotatable shaft being at an acute angle; and
 a second mechanism for opposing outward movement of the movable flange of the driven pulley away from the other flange of that pulley, said second mechanism comprising a second arm pivotally held to the movable flange of the driven pulley and movable toward and away from the second rotatable shaft, a spring means urging said second arm outwardly with respect to the second rotatable shaft, and a second ramp plate spaced from said movable flange of the driven pulley and fixed to the second shaft with a free end of the second arm being in slidable engagement therewith, said second arm, with the movable flange of the driven pulley close to the other flange, assuming an outwardly swung position, and, with movement of the movable flange of the driven pulley away from the other flange, said second arm moving inwardly along the second ramp plate in opposition to the spring means and toward the second rotatable shaft, said second arm having a length so related to its point of pivot as to permit movement of the second arm into substantially perpendicular disposition to the second rotatable shaft upon inward movement of said second arm.

24. A variable speed power transmission comprising:
 a driving pulley mounted on a first rotatable shaft and having a pair of opposed conical pulley flanges positioned thereon and providing therebetween a V-shaped groove for a pulley belt with one of the pulley flanges of the driving pulley being movable axially of the first rotatable shaft;

a driven pulley mounted on a second rotatable shaft and having a pair of opposed conical pulley flanges positioned on said second shaft and providing therebetween a V-shaped groove for a pulley belt with one of the pulley flanges of the driven pulley being movable axially of the rotatable second shaft;

a belt connecting said driving pulley and driven pulley;

a first mechanism for urging said movable flange of the driving pulley toward the other flange thereof, said first mechanism including a first arm pivotally held to the movable flange of the driving pulley and movable toward and away from the first rotatable shaft, means urging said first arm inwardly toward the first rotatable shaft, and a first ramp plate spaced from said movable flange affixed to the first shaft, said first ramp plate having a cam surface for slidably engaging the outer end of the pivoted first arm with a first portion of the cam surface adjacent the first rotatable shaft being at an acute angle, said cam surface of the first ramp plate having a second portion extending outwardly of the first portion, which said second portion is substantially perpendicular to the first rotatable shaft; and a second mechanism for opposing the outward movement of the movable flange of the driven pulley away from the other flange thereof, said second mechanism including a second arm pivotally held to the movable flange of the driven pulley and movable toward and away from said second rotatable shaft, a spring means urging said second arm outwardly with respect to the second rotatable shaft, and a second ramp plate spaced from said movable flange affixed to the second shaft with a free end of the second arm being in slidable engagement therewith, said second arm, with the movable flange of the driven pulley close to the other flange, assuming an outwardly swung position and, with movement of the movable flange away from the other flange, said second arm moving inwardly along the second ramp plate in opposition to the spring means and toward the rotatable second shaft, said second arm having a length so related to its point of pivot as to permit movement of the second arm into substantially perpendicular disposition to the second rotatable shaft upon inward movement of said second arm.

25. A variable speed power transmission comprising:

a driving pulley mounted on a first rotatable shaft and having a pair of opposed conical pulley flanges positioned thereon and providing therebetween a V-shaped groove for a pulley belt with one of the pulley flanges of said driving pulley being movable axially of the first rotatable shaft;

a driven pulley mounted on a second rotatable shaft and having a pair of opposed conical pulley flanges positioned on said second shaft and providing therebetween a V-shaped groove for a pulley belt with one of the pulley flanges of said driven pulley being movable axially of the rotatable second shaft;

a belt connecting the driving pulley and driven pulley;

a first mechanism for urging said movable flange of the driving pulley toward the other flange thereof, said first mechanism including a first arm pivotally held to the movable flange of the driving pulley and movable toward and away from the first rotatable shaft, means for holding the movable flange of the driving pulley away from the belt at lower speeds of the first rotatable shaft, a first spring means urging said first arm inwardly toward the first rotatable shaft and into engagement with said holding means when the first shaft is turning at a speed below a predetermined r.p.m., and a first ramp plate spaced from said movable flange and fixed to the first shaft, said first ramp plate having a cam surface for slidably engaging the outer end of the first pivoted arm upon movement of the first arm away from engagement with said holding means; and a second mechanism for opposing the outward movement of the movable flange of the driven pulley away from the other flange thereof, said second mechanism including a second arm pivotally held to the movable flange of the driven pulley and movable toward and away from the second rotatable shaft, a second spring means urging said second arm outwardly with respect to the second rotatable shaft, and a second ramp plate spaced from said movable flange and fixed to the second shaft with the free end of said second arm being in slidable engagement therewith, said second arm, with the movable flange of the driven pulley close to the other flange, assuming an outwardly swung position, and, with movement of the movable flange away from the other flange, said second arm moving inwardly along the second ramp plate in opposition to the second spring means urging the second arm outwardly and toward the second rotatable shaft; and said second arm having a length so related to its point of pivot as to permit movement of the second arm into substantially perpendicular disposition to the second rotatable shaft upon swinging said second arm to its innermost position.

26. A variable speed power transmission comprising:

a driving pulley mounted on a first rotatable shaft and having a pair of opposed conical pulley flanges positioned thereon and providing therebetween a V-shaped groove for a pulley belt with one of the pulley flanges of the driving pulley being movable axially of the first rotatable shaft;

a driven pulley mounted on a second rotatable shaft and having a pair of opposed conical pulley flanges positioned on said second shaft and providing therebetween a V-shaped groove for a pulley belt, with one of the pulley flanges of the driven pulley being movable axially of the rotatable second shaft;

a belt connecting said driving pulley and driven pulley;

a first mechanism for urging said movable flange of the driving pulley toward the other flange thereof, said first mechanism including a first arm pivotally held to the movable flange of the driving pulley movable toward and away from the rotatable first shaft, means for holding the movable flange away from the belt at lower speeds of the rotatable first shaft, a first spring means urging said first arm inwardly toward the first rotatable shaft and into engagement with said holding means when the shaft is turning at a speed below a predetermined r.p.m., and a first ramp plate spaced from said movable flange of the driving pulley and fixed to the first shaft, said first ramp plate having a cam surface for slidably engaging the outer end of the first pivot arm upon movement of the first arm away from engagement with said holding means with a first portion of the cam surface being shaped to bring the movable flange of the driving pulley into early contact with the belt and thereafter retard further axial movement of the movable flange into full engagement with the belt, said cam surface of the first ramp plate having a second short portion extending outwardly of the first portion, which second portion is substantially perpendicular to the first rotatable shaft, and a third curved portion disposed outwardly of the second portion, said third portion of the first ramp plate curving toward the movable flange of the driving pulley; and a second mechanism for opposing outward movement of the movable flange of the driven pulley away from the other flange thereof, said second mechanism including a second arm pivotally held to the movable flange of the driven pulley and movable toward and away from the second rotatable shaft, a second spring means urging said second arm outwardly with respect to the second rotatable shaft, and a second ramp plate spaced from said movable flange of the driven pulley and fixed to the second shaft with the free end of said second arm being in slidable engagement therewith, said second arm, with the movable flange close to the other flange, assuming an outwardly swung position, and, with movement of the movable flange of the driven pulley away from the other flange, said second arm moving inwardly along the second ramp plate in opposition to the second spring means urging the arm outwardly and toward the second rotatable shaft; and said second arm having a length so related to its point of pivot as to permit movement of the second arm into substantially perpendicular disposition to the second rotatable shaft upon swinging said arm to its innermost position.

27. A variable speed power transmission comprising: a driving pulley mounted on a first rotatable shaft and having a pair of opposed conical pulley flanges positioned thereon and providing therebetween a V-shaped groove for a pulley belt with one of the pulley flanges of the driving pulley being movable axially of the first rotatable shaft;

a driven pulley mounted on a second rotatable shaft and having a pair of opposed conical pulley flanges positioned on said second shaft and providing therebetween a V-shaped groove for a pulley belt with one of the pulley flanges of the driven pulley being movable axially of the rotatable second shaft;

a belt connecting said driving pulley and said driven pulley;

a first mechanism for urging said movable flange of the driving pulley toward the other flange thereof, said first mechanism including a first arm pivotally held to the movable flange of the driving pulley and movable toward and away from the rotatable first shaft, means for holding the movable flange away from the belt at low speeds of the rotatable first shaft, a first spring means urging said first arm inwardly toward the first rotatable shaft and into engagement with said holding means when the shaft is turning at a speed below a predetermined r.p.m., and a first ramp plate spaced from said movable flange of the driving pulley and fixed to the first shaft, said first ramp plate having a cam surface for slidable engagement by the outer end of the first pivot arm upon movement of the first arm away from engagement with said holding means with a first portion of the cam surface being shaped to bring the movable flange of the driving pulley into early contact with the belt and thereafter retard further axial movement of the movable flange into full engagement with the belt, said cam surface of the first ramp plate having a second short portion extending outwardly of the first portion, which second portion is substantially perpendicular to the first rotatable shaft, and a third portion disposed outwardly of the second portion and extending generally toward the movable flange of the driving pulley and including a first section followed by a second section with an abrupt change in direction of the cam surface at the juncture of the two sections of said third portion; and a second mechanism for opposing outward movement of the movable flange of the driven pulley away from the other flange thereof, said second mechanism including a second arm pivotally held to the movable flange of the driven pulley and movable toward and away from the second rotatable shaft, a second spring means urging said second arm outwardly with respect to the second rotatable shaft, and a second ramp plate spaced from said movable flange of the driven pulley and fixed to the second shaft with the free end of said second arm being in slidable engagement therewith, said second arm, with the movable flange close to the other flange, assuming an outwardly swung position, and, with movement of the movable flange of the driven pulley away from the other flange, said second arm moving inwardly along the second ramp plate in opposition to the second spring means urging the arm outwardly and toward the second rotatable shaft, and said second arm having a length so related to its point of pivot as to permit movement of the second arm into substantially perpendicular disposition to the second rotatable shaft upon swinging said arm to its innermost position.

References Cited by the Examiner
UNITED STATES PATENTS
2,556,512  6/1951  Ammon _____ 74—230.17

DAVID J. WILLIAMOWSKY, *Primary Examiner.*

LEONARD H. GERIN, *Examiner.*